United States Patent
Erofeev et al.

(10) Patent No.: US 12,493,627 B2
(45) Date of Patent: Dec. 9, 2025

(54) OPTIMIZATION ENGINE IN A STRUCTURED AND UNSTRUCTURED DATA SYSTEM

(71) Applicant: THE BOSTON CONSULTING GROUP, INC., Boston, MA (US)

(72) Inventors: Pavel Erofeev, Boston, MA (US); Ning Yang, Boston, MA (US); Marcin Druzkowski, Boston, MA (US); Ronny Fehling, Boston, MA (US)

(73) Assignee: THE BOSTON CONSULTING GROUP, INC., Boston, MA (US)

( * ) Notice: Subject to any disclaimer, the term of this patent is extended or adjusted under 35 U.S.C. 154(b) by 0 days.

(21) Appl. No.: 18/389,436

(22) Filed: Nov. 14, 2023

(65) Prior Publication Data

US 2025/0156439 A1     May 15, 2025

(51) Int. Cl.
*G06F 16/25* (2019.01)
*G06F 16/28* (2019.01)

(52) U.S. Cl.
CPC .......... *G06F 16/258* (2019.01); *G06F 16/285* (2019.01)

(58) Field of Classification Search
CPC .................. G06F 16/258; G06F 16/285
See application file for complete search history.

(56) References Cited

U.S. PATENT DOCUMENTS

| | | | |
|---|---|---|---|
| 10,853,385 B1 * | 12/2020 | Truong | G06F 17/18 |
| 2019/0378050 A1 * | 12/2019 | Edkin | G06N 20/20 |
| 2020/0005153 A1 * | 1/2020 | Ramanath | G06F 16/285 |
| 2020/0090012 A1 * | 3/2020 | Darnell | G06N 3/045 |
| 2020/0233857 A1 | 7/2020 | Fehling et al. | |

OTHER PUBLICATIONS

Joshi et al., Predicting Rare Classes: Can Boosting Make Any Weak Learner Strong?, SIGKDD 2002, p. 297, ACM, retrieved on Feb. 4, 2025, retrieved from the internet <URL:https://dl.acm.org/doi/pdf/10.1145/775047.775092> (Year: 2002).*

* cited by examiner

*Primary Examiner* — Tyler J Torgrimson
(74) *Attorney, Agent, or Firm* — Fish & Richardson P.C.

(57) ABSTRACT

Disclosed are techniques that generate a structural representation of a plurality of documents, the structural representation including a plurality of nodes and a plurality of edges, with the plurality of nodes being representations of the plurality of documents and the plurality of edges representing a feature in common between nodes of the plurality of nodes, with each node holding a vector of confidence values for weak models on a current optimization step and a weighted prediction for each of the weak models, generate a local ensemble model from the structural representation of the plurality of documents combined with the weighted prediction of the weak models, with the generated local ensemble model having a higher predictive power than any weak model individually, and generate a label for each node based on the local ensemble model.

20 Claims, 11 Drawing Sheets

800

Generate a structural representation of a plurality of documents, the structural representation including a plurality of nodes and a plurality of edges, with the plurality of nodes being representations of the plurality of documents and the plurality of edges representing a feature in common between nodes of the plurality of nodes, with each node holding a vector of confidence values for weak models on a current optimization step and a weighted prediction for each of the weak models

802

Generate a local ensemble model from the structural representation of the plurality of documents combined with the weighted prediction of the weak models, with the generated local ensemble model having a higher predictive power than any weak model individually

804

Generate by the computer system, a label for each node based on the local ensemble model

OPTIMIZATION ENGINE IN A STRUCTURED AND UNSTRUCTURED DATA SYSTEM

TECHNICAL FIELD

This disclosure relates to computerized classification models for classifying documents.

BACKGROUND

In general, document classification models can be used to classify documents. For example, document classification models can be used to identify one or more labels, categories, classes, etc. of the documents, based on the context and/or the contents of the documents.

Further, budget constraints that are placed on a classification process can limit the usefulness of document classification models. A "budget constraint" (BC) can refer, for instance, to a constraint that places a limit on an optimization of a classification model. Examples of constraints include users' availability to review the documents and/or verify the performance of the classification model (e.g., the availability of "expert" reviewers), time to complete the classification project, cost of implementing the classification project, organizational processes, etc. The term "budget" as used in "budget constraint" (BC) does not necessarily relate to a company's budget or money, and can represent any type of limited resource that limits the theoretical precision of the optimization problem. In general, it may be desirable to have at least one BC, as otherwise to find an optimal solution would require performing an exhaustive exploration of all possible solutions. In some cases, there are several BCs that need to be considered.

Accuracy of a document's classification is a significant factor that affects optimality of applying a set of levers. In general, a lever can refer to a set of actions that are applied to optimize a goal. As an example, a lever can be a change of company policy, or supplier or organizational process/structure. Levers are generally dependent upon and specific to contextual elements, such as industry, organizational structure, company processes, and approaches to working. These contextual elements are often not easily captured through standardized data representations.

In some implementations, these levers can be organized hierarchically with the highest level being organizational or functional, a second level being a strategic level following a third level being a tactical level. An example of hierarchy has overall marketing costs reduction as a first level of levers, digital marketing costs reduction as the second level of levers and the introduction of A/B tests to optimize Return on Investment (ROI) as the third level of levers.

One approach uses a dedicated classification model that is constructed for each company and fine-tuned to specifics of the company to provide higher precision. Classification models that are based on meta or unstructured information and/or past case learning are referred to herein as weak models (WMs).

WMs may share one or more of the following properties. Generally a WM is based on a subset of structured and/or unstructured properties of the document and gives a meaningful prediction to at least some significant part of the document. A WM is accurate enough for the classification at least on some parts of the data and is context-free, e.g., does not contain specifics of the industry and/or organization structure. On the other hand, a WM does not satisfy accuracy requirements for the selection of optimal levers.

An optimization over classification process involves an initialization, where documents are made available with all the structured data fields normalized to a table representation and non-structured data are preprocessed and normalized, e.g., in case of textual data, translated to one or a few common languages and Natural Language Programming (NLP) cleaning steps are applied. The optimization applies a weak model to the documents to obtain updated predictions (e.g., a static mapping of one feature of the documents to a target taxonomy is also considered as a weak model).

SUMMARY

In general, contextual information can be added to the available structured data and WMs via a "human-in-the-loop" process that includes manual reviewing the predictions of the WMs and the documents to confirm or change classification labels. This process often requires deep understanding of the industry and company context and thus access to a pool of highly skilled experts. Those highly skilled experts are a limited resource that enforces additional constraints on the optimization.

The data are represented in a simplified structural way. This is done to reduce the complexity of the problem and estimate expert time requirements for the manual review. A subset of documents are selected for the manual reviewing. The selected documents are reviewed by the experts and updated in the dataset and a machine learning model is built or updated with respect to the reviewed documents. The constraints are evaluated with respect to the reviewed documents, and the process is repeated until the required accuracy requirements are met or some of the limited resources (e.g., expert availability) are exhausted.

In some implementations, documents are represented as multidimensional vectors. Data complexity reduction is provided via grouping of those multidimensional vectors by a fixed set of dimensions and representing a cluster of those vectors by a single vector (one of the documents) and provide meta-information that specifies cluster statistics of the cluster. While significantly reducing the manual review volumes required, this approach may have certain drawbacks in at least some implementations.

As an example, many naturally different documents can be grouped into a cluster that continually grows a size of the cluster. At some point, such cluster may be split into sub-clusters after a manual review, and thee sub-clusters may be further split into sub-sub-clusters that are also reviewed again on a next optimization iteration. Clustering therefore is sensitive to the choice of dimensions by which the grouping is performed. If the dimensions that are important to distinctions among the documents are not included into the set of clustering dimensions, the manual review becomes harder and longer to perform. The most representative document is chosen with respect to the target metrics, and in some cases, might not reflect many of the documents in the cluster.

Further, the documents can be selected with respect to one target metric, e.g., a cost value. In some cases, the documents with higher target metric values are significantly different from long-tail documents. Thus, when the manual review is focused only on the former, accuracy of classification for the latter can suffer. In addition, the machine learning models can be global and generic, and may not account for local connections of the documents. Long-tail documents are a large set of diverse documents having low cost value, each but typically forming a significant cost value together.

According to an aspect, a computer implemented method includes generating by a computer system, a structural representation of a plurality of documents, the structural representation including a plurality of nodes and a plurality of edges, with the plurality of nodes being representations of the plurality of documents and the plurality of edges representing a feature in common between nodes of the plurality of nodes, with each node holding a vector of confidence values for weak models on a current optimization step and a weighted prediction for each of the weak models, generating by the computer system, a local ensemble model from the structural representation of the plurality of documents combined with the weighted prediction of the weak models, with the generated local ensemble model having a higher predictive power than any weak model individually, and generating by the computer system, a label for each node based on the local ensemble model.

One or more of the following embodiments or other embodiments disclosed herein may be included with the above aspect.

Each edge has a type and each type of an edge represents a feature of the plurality of documents. The features of the plurality of documents is a meta-feature or an associated target metric, or processed unstructured data.

Generating a label for each node provides either a manually confirmed and/or corrected label that is assumed to be a true label or a resulting weighted prediction of the weak models.

The confidence values vary from 0 to 1 and the confidence values represent uncertainty in predictions made by the weak models.

The confidence values are probability estimates or normalized relative distances to known exemplars of a class of the weak models.

Each node holds a set of weights for each of the weak models. A sum of the weights is equal to a value of 1.

In another aspect, a computer implemented method includes: accessing, by a computer system from a hardware computer storage device, a plurality of documents, and generating, by the computer system, a structural representation of the plurality of documents. The structural representation includes a plurality of nodes, where each of the nodes represents a respective one of the documents. Each of the nodes includes a vector representing: (i) a plurality of labels for the document represented by that node, where at least some of the labels are determined by one or more computer models of a plurality of computer models, (ii) a plurality of confidence values, where each of the confidence values is associated with a respective one of the labels, and (iii) a plurality of weights, where each of the weights is associated with a respective one of the computer models. Further, the representation includes a plurality of edges interconnecting the nodes, where each of the edges represents a similarity between respective pairs of the documents. Further, the method includes: selecting, by the computer system, a subset of the documents based on the structure representation; causing, by the computer system, the subset of the documents to be provided to one or more users; receiving, by the computer system, input data from the one or more users, where the input data represents a manually determined label for each document of the subset of the documents; updating, by the computer system, the structural representation based on the input data; determining, by the computer system, an output label for each of the documents based on the structural representation; and storing, by the computer system using the hardware computer storage device, data representing the output labels of the documents.

One or more of the following embodiments or other embodiments disclosed herein may be included with the above aspect.

Each of the computer models is a weak model (WM).

Updating the structural representation includes at least one of: modifying one or more of the weights of one or more of the nodes, or modifying one or more of the confidence values of one or more of the nodes.

The one or more weights are modified by a value determined based on a number of the computer models.

Updating the structural representation includes: determining, based on the input data, that a first label for a first node determined by a first computer model is different from a first manually determined label for the first node; and in response, decreasing a weight of the first computer model for one or more second nodes that are interconnected to the first node.

Updating the structural representation includes: determining, based on the input data, that a first label for a first node determined by a first computer model matches a first manually determined label for the first node; and in response, increasing a weight of the first computer model for one or more second nodes that are interconnected to the first node.

Selecting the subset of the documents includes: determining a relationship between each node to each of its neighboring nodes based on the structural representation, and selecting the subset of the documents based on the relationship.

Selecting the subset of the documents includes: estimating a change in confidence metrics of the nodes that would result from obtaining a manually determined label for one or more of the documents, and selecting the subset of the documents that would maximize the change in confidence metrics of the nodes.

Generating the structural representation includes, for each of the nodes, setting each of the weights of the nodes to a common value.

Generating the structural representation includes, for each of the nodes, setting each of the weights of the nodes based on a trust metric associated with a respective one of the computer models.

Each of the edges has an edge type representing at least one of: a meta-feature of one or more of the documents, a target metric associated with one or more of the documents, or processed unstructured data associated with one or more of the documents.

Updating the structural representation includes retraining at least one of the computer models.

Other aspects include computer systems and computer program products.

One or more of the above aspects may provide one or more of the following advantages.

Described is an iterative discrete optimization that is based on inherited document classifications where the classification precision requirements change over time with respect to budget constraints. The approach described herein for selecting of a subset of documents for manual review on each iteration that can optimize several target metrics at the same time (e.g., maximize total covered costs, emission, time, human effort, etc., while minimizing the uncertainty at the same time) and be more flexible to the changing accuracy requirements for the classification model.

Data structures are used to represent documents as a multi-edge network that facilitate training of and optimization of a classification model. A local ensemble model that is based on the multi-edge network data representation is combined with weak models into a local ensemble aggregation to achieve better accuracy within the same limited resources for a manual review compared to approaches that do not include the aspects described herein.

Further, in at least some implementations, the subject matter described herein can improve the accuracy and efficiency of computerized classification models in classifying documents. For example, in accordance with the subject matter described herein, a computer system can identify similarities, differences, and/or other relationships between sets of documents, and generate data structures (e.g., a computerized graph or multi-edge network) representing the documents and the relationships between them. Further, using these data structures, the computer system can assign classifications to each of the documents by dynamically weighing the output of multiple computerized models (e.g., weak models), and selecting the output of a particular computerized model that best represents the meaning, context, and/or contents of each document. Further, these operations can be performed using one or more computer-specific techniques or rules (e.g., as described in further detail herein) that would be infeasible and/or impractical for a human to perform mentally.

Further still, in at least some implementations, the subject matter described herein can improve the efficiency of a classification process. For example, a computer system can automatically select subset of documents for manual review by a user (e.g., an expert reviewer), and update the data structure based on feedback from the user. In particular, the computer system can automatically select certain documents that, when reviewed by a user, would maximize (or other sufficiently increase) the information that would be gained for the overall collection of documents. Accordingly, the computer system can reduce the amount of manual effort expended during the classification process, which can increase the speed at which the classification process is performed by the computer system.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 8A-8B are flow diagrams of further processes for performing document classification using one or more computer models.

DETAILED DESCRIPTION

Figure 1:
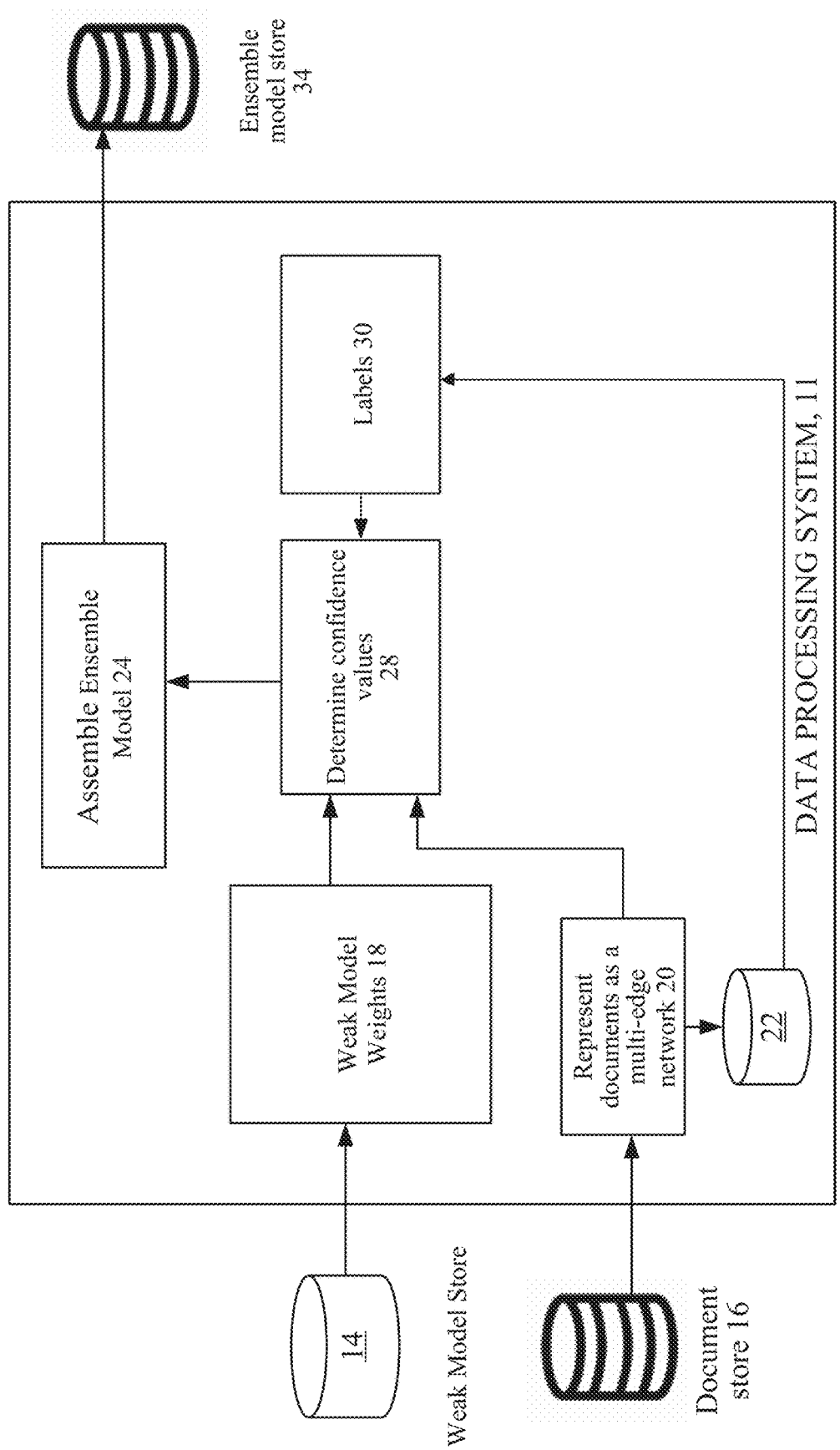
FIG. 1 is diagram of an example special purpose system for training of and optimization of a classification model.

In general, document classification models can be used to classify documents. For instance, document classification models can be used to identify one or more labels, categories, classes, etc. of the documents, based on the context and/or the contents of the documents.

As an example, a computer system can identify similarities, differences, and/or other relationships between sets of documents, and generate data structures (e.g., a computerized graph to multi-edge network) representing the documents and the relationships between them. Further, using these data structures, the computer system can assign classifications to each of the documents by dynamically weighing the output of multiple computerized models (e.g., weak models), and selecting the output of a particular computerized model that best represents the meaning, context, and/or contents of each document.

Further, various iterative discrete optimization processes can be performed to improve the accuracy and efficiency of the classification models. These process can be performed based on inherited document classifications where the classifications precision requirements change over time with respect to budget constraints.

In general, these processes can include using a computer system to select a subset of documents for the manual review by a user (e.g., an expert reviewer) on each iteration that can optimize several target metrics at the same time (e.g., maximize total covered costs, emission, time, human effort, etc., while minimizing the uncertainty). Further, these processes allow the computer system to dynamic adapt to changes in the accuracy requirements for the classification model.

Also described is a data structure used for document representation. The data structure represents the documents as a multi-edge network (90 see FIGS. 5-7) that facilitates the training of and optimization of a classification model.

Also described is a local ensemble model that is based on the multi-edge network data representation that is combined with the WMs into local ensemble aggregation to achieve better accuracy within the same limited resources for the manual review compared to the state-of-the-art-approaches.

A semi-structured set(s) of documents related to the target metrics are available, e.g., financial transactions, operational data (such as travel records, etc.). In some cases, those datasets contain both structured (e.g., numerical) and unstructured data such as natural text, images, video files or sound recordings. Examples of structured data include general ledger accounts, types of materials, costs, etc. Examples of unstructured data include description of financial transactions, purchased goods, categories of travel, marketing creatives, etc.

The application and quantification of each of the levers are based on a set of parameters. As an example, for a set of documents pertaining to air travel, parameters can include the number and cost of business class flights over a certain length of time (e.g., 4 hours) by employees. Some of these parameters can be industry specific, whereas others can be universal. Some of these parameters can be shared across several levers (e.g., one-to-many) and the parameters can generally follow the same hierarchical structure as the levers. The set of hierarchical parameters are referred to herein as a taxonomy. An optimal selection of levers depends on the ability to quantify each of the above parameters. In the transparency phase of the project, the objective is therefore to classify all the documents according to the collective understanding of the taxonomy.

Figure 5:
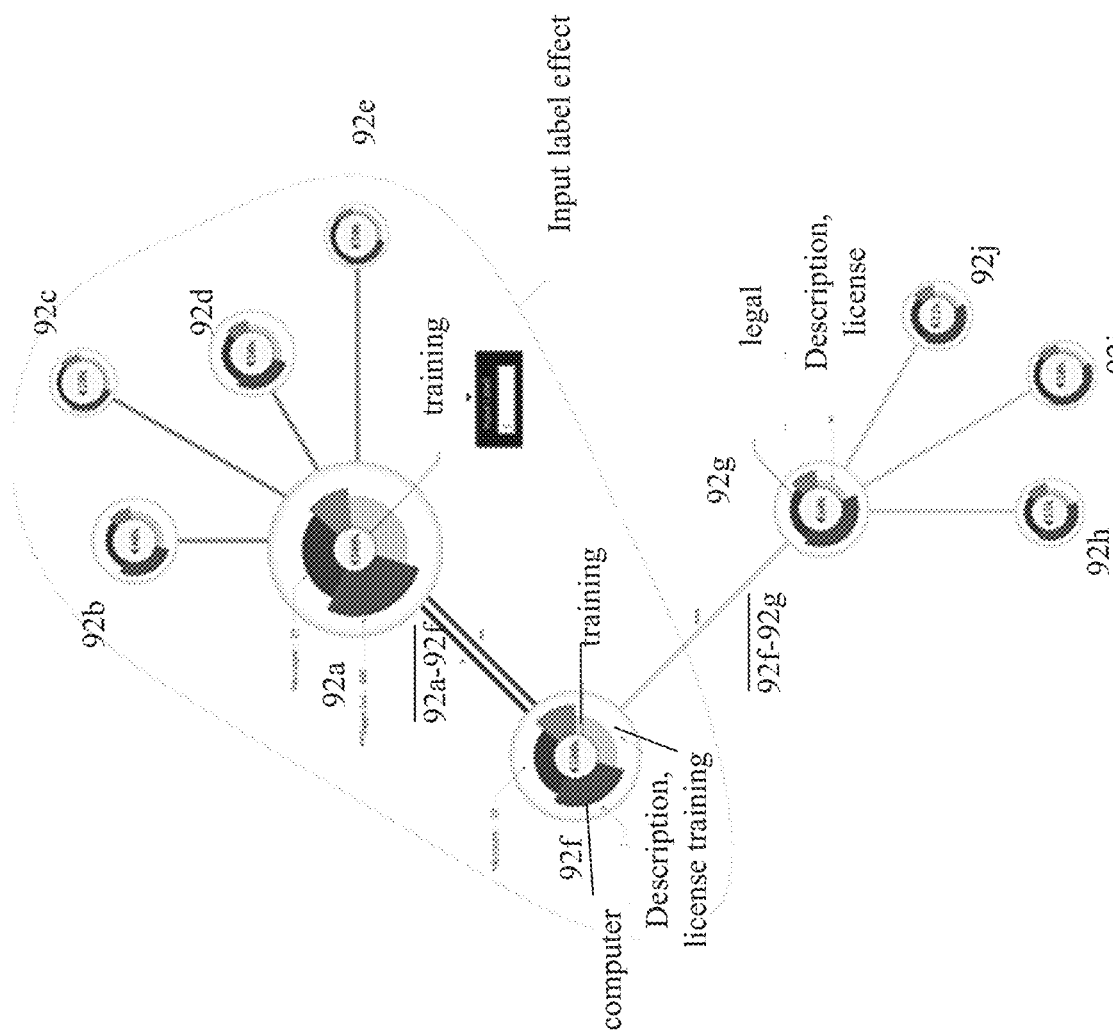
FIGS. 5-7 are diagrams of example data structures for representing documents relationship between the document, and classification of documents based on one or more computer models.
Figures 6, 6A:
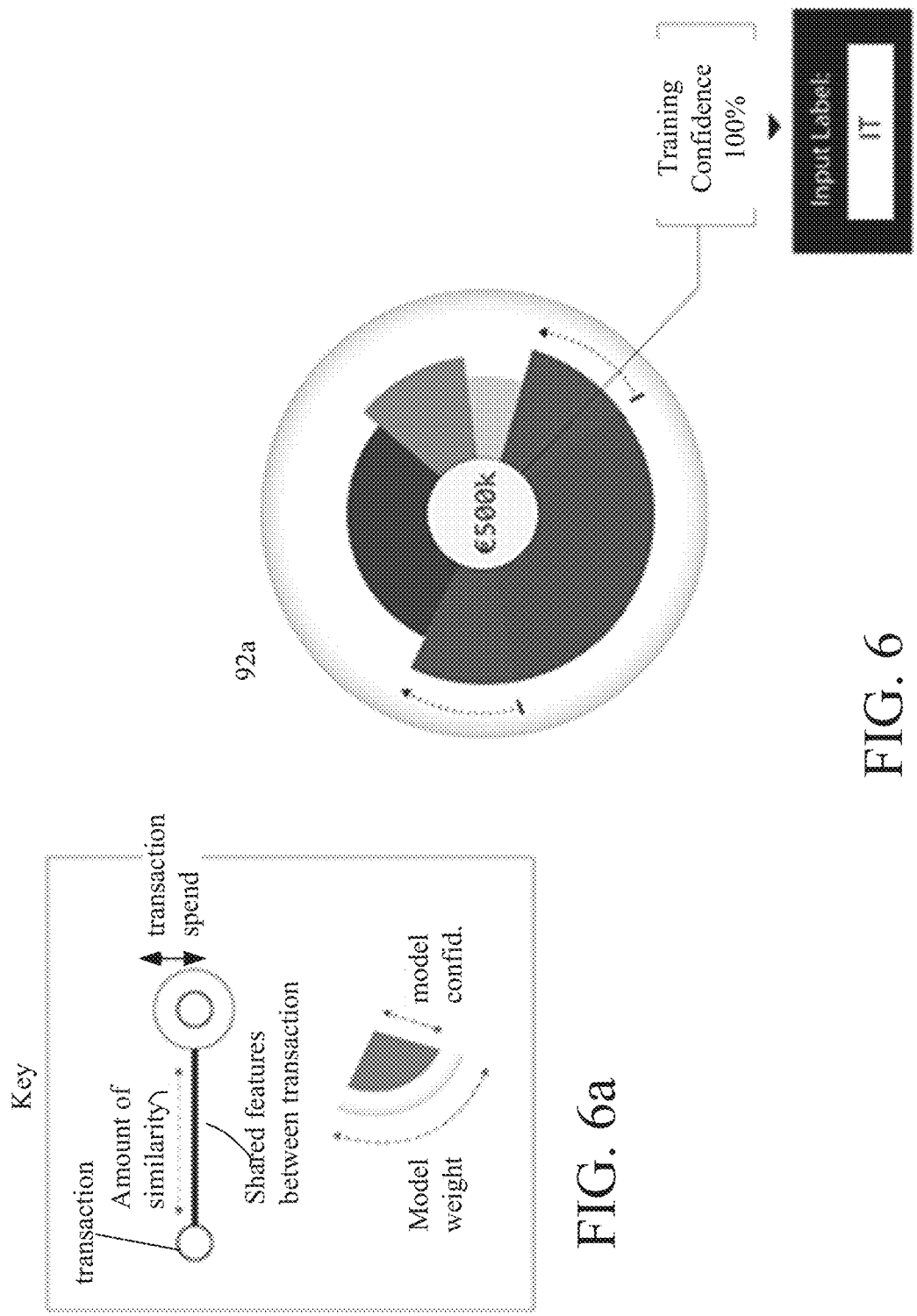
Figure 7:
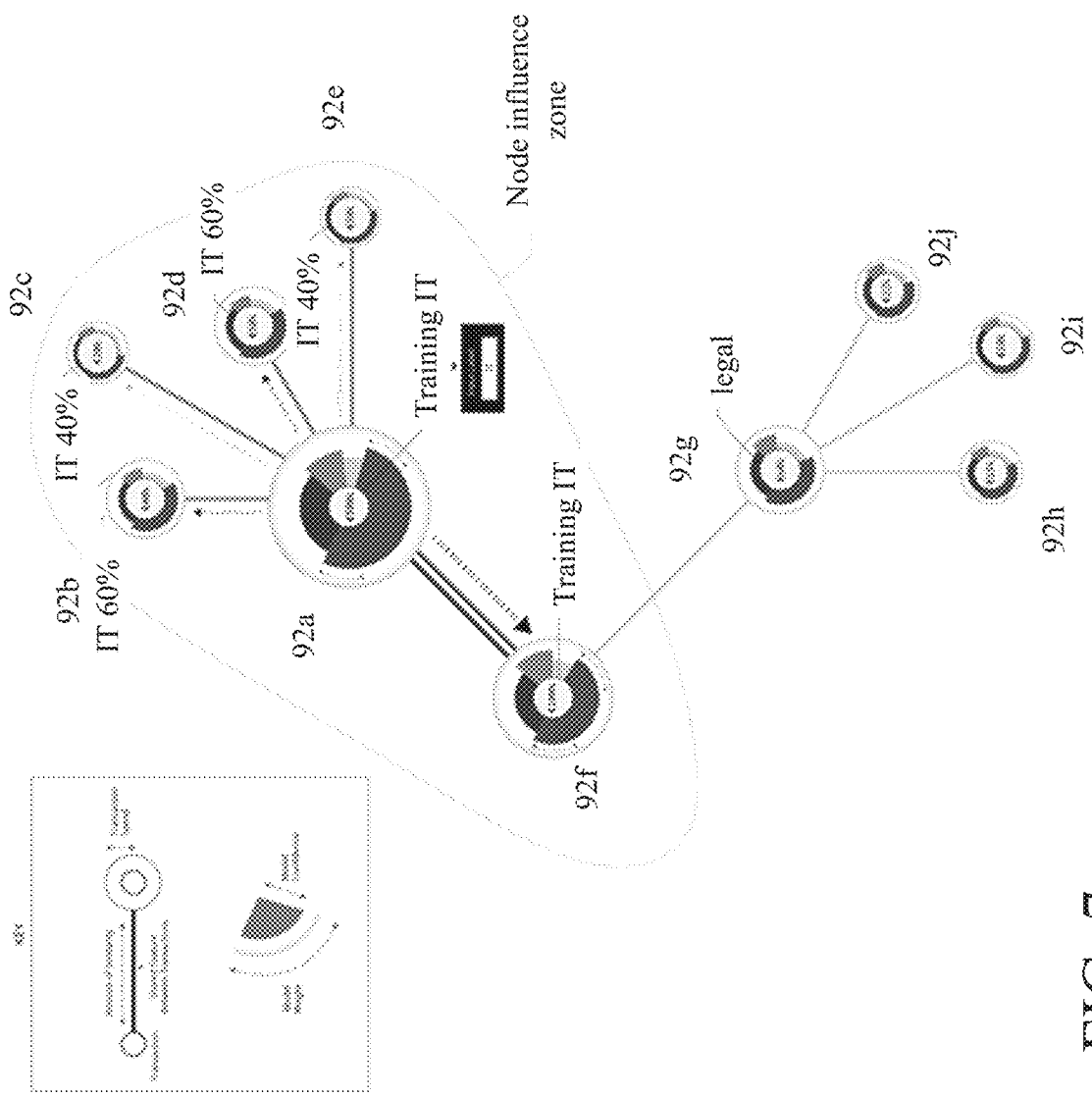

A special purpose system 10 for training of and optimization of a classification model is shown in FIG. 1. The special purpose system 10 includes a WM store 14 that stores weak models (WM's), a document store 16, and a local ensemble model store 34. The WM store 14 sends control signals to an engine 18. The engine 18 determines weights for the WM's. The document store 16 sends documents to an engine 20 that represents the documents as a multi-edge network 90 (FIGS. 5-7). The engine 20 stores the representations in a store 22. The engine 20 that represents the documents as a multi-edge network 90 (FIGS. 5-7) also feeds an engine 28 that determines confidence values. The engine 28 that determines confidence values is also fed by the engine 18 that determines weak model weights and an engine 30 that determines labels. The labels are either manual or automatically derived. The output of the engine 28 that determines confidence values feeds an engine 24 that assembles the weighted, labeled weak models into a local ensemble model. The engine 24 that assembles the local ensemble model sends the assembled local ensemble model to the local ensemble model store 34.

Figure 2:
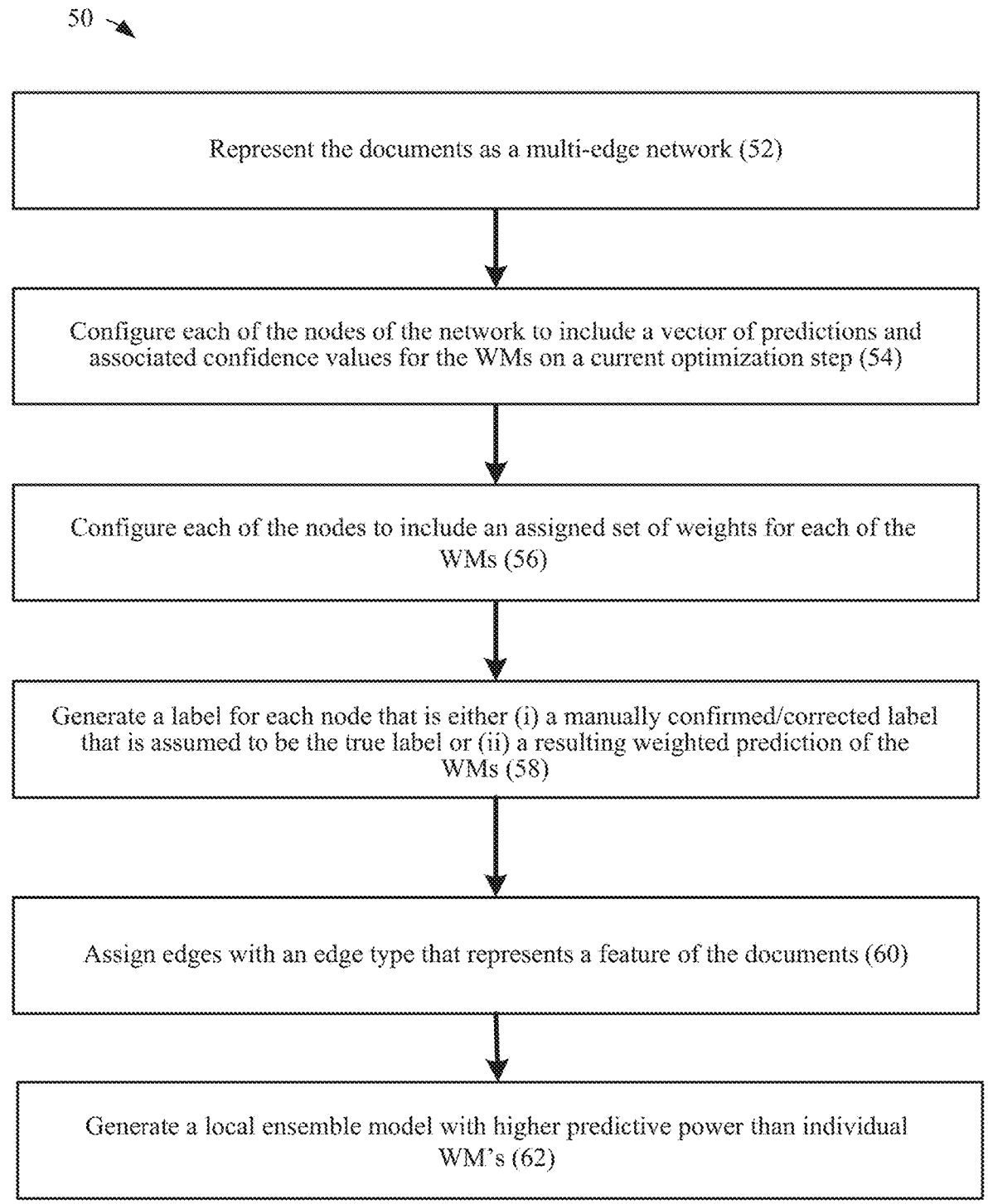
FIGS. 2-4 are flow diagrams of example processes for performing document classification using one or more computer models.

Discussed below is a process 50 for performing document classification using one or more computer models. In process 50, data is represented as a multi-edge network 90 (FIGS. 5-7) to reduce the complexity of the classification process and to select of a subset of the documents for the manual review. The process 50 allows for any number of the WMs to be applied to allow a computer system to select classifications to documents from among a diverse set of inputs. The process 50 is shown in FIG. 2. In general, the process 50 can be performed, at least in part, by one or more computer systems.

According to the process 50, a computer system represents a set of documents as a multi-edge network 90 (FIGS. 5-7) including several nodes (block 52). Each node represents a document (e.g., the number of nodes is equal to the number of documents).

Further, the computer system configures each of the nodes, such that each node includes a vector of predictions and associated confidence values for the WMs on a current optimization step (block 54). As an example, confidence values can vary from 0 to 1. The confidence values represent a degree of uncertainty in a prediction made by the WMs.

For example, in case of the simplest deterministic mapping, the confidence values can be 1 (one) and the predictions can simply be the values from the mapping. As another example, for more complex machine learning (ML) models, the ML models may have a natural way to define the confidence values. The confidence values can be probability estimates or normalized relative distances from known exemplars of the class. One example of a ML model is a logistic regression model that predicts probabilities for each of the labels thus providing not only prediction, but also an uncertainty level of prediction. Another example is nearest neighbors class of models, whereby each prediction has associated distance to the predicted class that can be considered as uncertainty of prediction. Other ML models may be used.

Further, the computer system configures each node, such that each node includes an assigned set of weights for each of the WMs (block 56). If a given WM is not applicable for the given node, the corresponding weight can be 0 (zero). The set of weights are updated on each step of the optimization according to the logic described below regarding propagation (see FIG. 3, block 78). The initial set of weights can be simply uniform for each applicable WM for each node or can be based on some prior trust value associated with the models. In at least some implementations, the sum of the weights can always be equal to 1 (one).

Further, the computer system generates a label for each node (block 58). In general, a label can be either (i) a manually confirmed label and/or a corrected label (e.g., as manually specified by a user) that is assumed to be the true label or (ii) a resulting weighted prediction of the WMs. A similar approach is can be for prediction uncertainty. As an example, prediction uncertainty can be zero for nodes that have been manually confirmed by a user (e.g., nodes that have a document label that has been manually reviewed and confirmed by a user). Further, the computer system assigns edges to the nodes (block 60). In general, edges are used to connect nodes to one another. Edges can have an edge type, and each type can represent a feature of the documents. In some implementations, the edge type can be a meta-feature, an associated target metric, or processed unstructured data. An edge of any type connecting any two nodes (documents) means that there is a common feature between those two nodes and hence between those documents. For example, if in two financial transactions there is a general ledger account and words with semantically close meaning in descriptions (e.g., "flight tickets" and "airfare"), the corresponding nodes representing those documents can be connected by the "general ledger account" link and by the "description closeness" link. Links as used in this instance refer to visualization related not structural.

Figure 3:
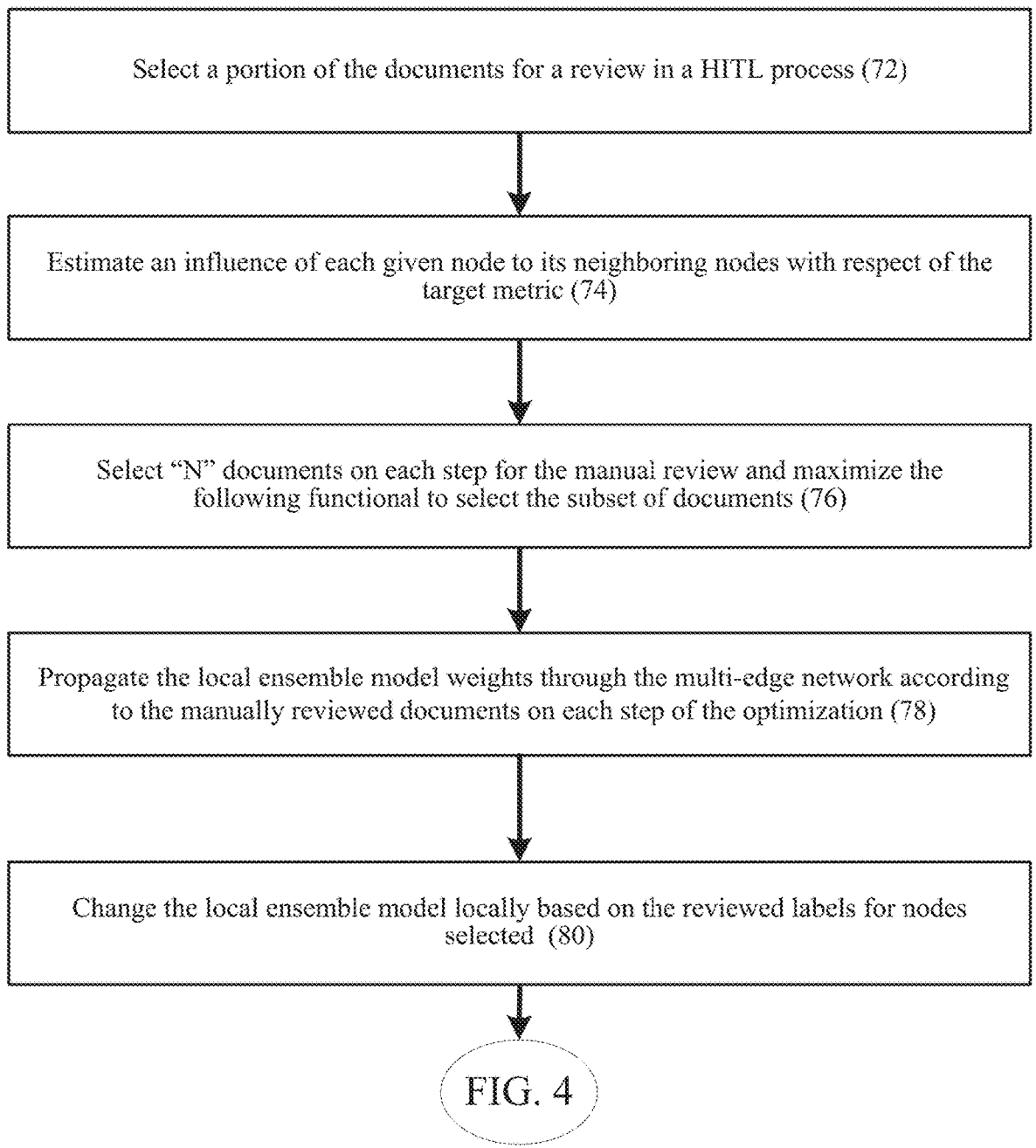
Figure 4:
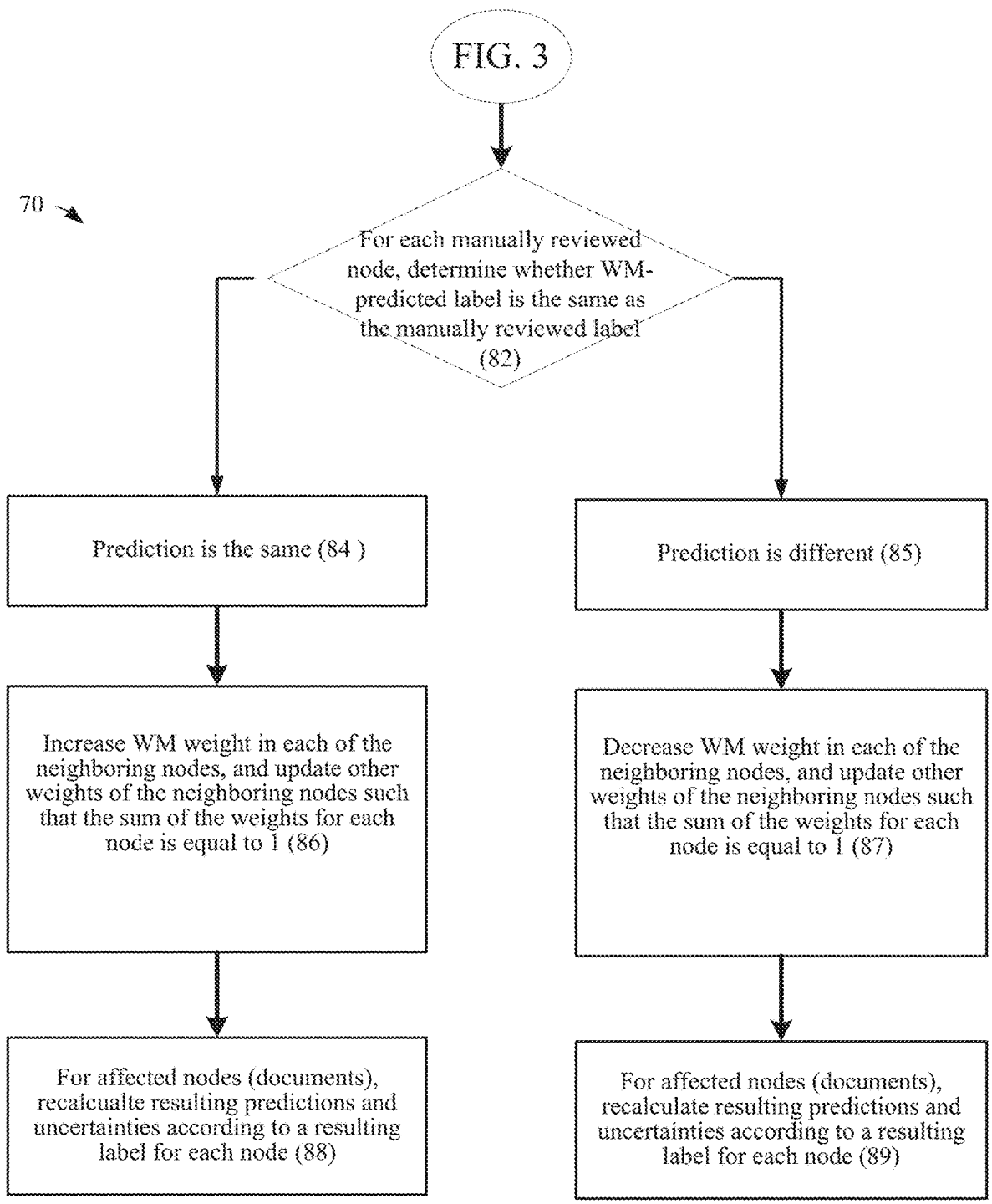

Another process 70 for performing document classification using one or more computer models is shown in FIGS. 3 and 4. In general, the process 70 can be performed, at least in part, by one or more computer systems.

The process 70 includes selecting a portion of the documents for a review in a human-in-the-loop (HITL) process (block 72). In general, this selection can be performed manually (e.g., performed by a user) or automatically (e.g., performed by a computer system without manual input). However, the choice of the subset of documents for review on each optimization step is not limited to the target metric values (e.g., maximize total covered costs, emission, time, human effort, etc.,) as discussed above of each document. Rather, according to the process 70, an influence of each given node to its neighboring nodes with respect of the target metric is estimated in a specific way (block 74). For example, influence of (e.g., total cost value) for each node can be defined by the sum of the cost values of all neighbors multiplied by the weights of the links between them.

According to the process 70, "N" documents are selected on each step for the manual review and the following functional is maximized to select the subset of documents (block 76). The functional is a weighted sum, and refers to the comments with respect to the total impact or the sum of neighboring nodes in the graph multiplied by weights. Total impact of knowing the true labels for each combination of length N of documents on the uncertainty of the target metric value covered by the WMs combination prediction.

In some implementations, the selected subset is chosen by exhaustively testing of all combinations of size N. However, in at least some implementations, this may be not be possible due to the time constraints. In some implementations, the selected subset is chosen by performing a greedy approach where documents are added one by one each time maximizing the same functional, which may be considerably faster than performing exhaustive testing.

Further, the local ensemble model weights are propagated through the multi-edge network 90 (FIGS. 5-7) according to the manually reviewed documents on each step of the optimization (block 78). Updates of the local ensemble model are used to change the local ensemble model locally based on the reviewed labels for nodes selected by the algorithm from FIG. 4 (block 80). Each node might have its own "local" ensemble of WMs.

Referring now to FIG. 4, for each document (node) that has been manually reviewed by a user, a determination is made whether the prediction(s) made by the MWs(s) for that node is the same as the label that has been manually reviewed by the user (e.g., a label that has been selected by the user as the correct label for the node) (block 82).

If the prediction of the WM (e.g., a predicted label of the node) is the same as the manually reviewed label (block 84), the weights of that WM in the neighboring nodes are increased in the resulting prediction and resulting uncertainty (block 86). Neighboring nodes can include, for example, other nodes that are interconnected to the node that was manually reviewed via one or more links (e.g., links representing similar features between the nodes). Other weights for those nodes are updated such that the sum of weights remains equal to one "1." The generated local ensemble model will have a higher predictive power than any individual WM. The affected nodes (documents) resulting predictions and uncertainties are recalculated according to a resulting label for each node 88. On the other hand, if the prediction of the WM (e.g., a predicted label of the node) is different than the manually reviewed label (block 85), the WM weights of the neighboring nodes co are decreased in the resulting prediction and resulting uncertainty (block 87). Other weights for those nodes are updated to fulfil the sum of weights being equal to one "1."

As an example, several WMs can assign several different labels to a particular document (node). If the user manually reviews the node and its labels, and determines that a particular label is correct, the weight of the WM that assigned the correct label to the node can be increased in one or more of the neighboring nodes (e.g., the nodes that are interconnected to the node that have been reviewed by the user). Further, in the neighboring nodes, the weights of the other WMs can be updated such that the sum of all of the WMs for each of those nodes is 1. Accordingly, the predictions by that WM would be given greater weight for other similar documents.

However, if the user manually reviews the node and its labels, and determines that a particular label is incorrect, the weight of the WM that assigned the incorrect label to the node can be decreased in one or more of the neighboring nodes (e.g., the nodes that are interconnected to the node that have been reviewed by the user). Further, in the neighboring nodes, the weights of the other WMs can be updated such that the sum of all of the WMs for each of those nodes is 1. Accordingly, the predictions by that WM would be given less weight for other similar documents.

For all of the affected nodes (documents), resulting predictions and uncertainties are recalculated according to a resulting label for each node that is either manually confirmed/corrected label that is assumed to be the true label or a resulting weighted prediction of the WMs (blocks 88 and 89).

In general, the true label for a document can be the label that is provided through human input (e.g., after a manual review of the document) and can be assumed to be the correct value of classification. Each WM in turn gives a label prediction that can match the true label (correct prediction) or not (wrong prediction or mis-prediction). The weighted prediction of WMs is the ensemble prediction and it can be correct or not, as well. The same applies for the resulting prediction uncertainty being sharp zero for the manually reviewed document labels. Further, every document has a true label (e.g., in at least some cases, a single label).

The increase and decrease of the weights are based on heuristics and can depend on the number of WMs considered. In general, the heuristics can be parameters that are pre-specified, not determined from execution. The more WMs that are considered, the more significant the individual WM's can be (e.g., up to 2 times up or down for the case of 2-3 WMs). Significant can refer, for example, to the weight of the WM prediction in the resulting ensemble. Up to 2 times up or down refers to voting weight and is defined by the heuristic, e.g., every time the model is run, divide its weight by 2. On each step of the optimization, some of the WMs can be retrained with respect to newly reviewed documents. Retraining of the newly reviewed documents is performed before the calculation of the ensemble predictions for each node.

An example of the multi-edge network 90 that provides a local ensemble model is shown in FIGS. 507. FIG. 6 shows a key that is applicable to FIG. 5-7.

FIG. 5 shows nodes 92*a*-92*j* representing documents arranged in the multi-edge network 90 with WMs (WMs represented as segments within the nodes). The nodes have initial weights (relative lengths of the model) and initial, shared features by line segments, e.g., $\overline{92a\text{-}92f}$ and $\overline{92f\text{-}92g}$. The nodes have initial descriptions with confidence values (relative thickness of the model) assigned to the nodes. Nodes 92*a*-1 and 92*f*-1 are shown with initial model weights. The optimization identifies the node 92*a* to be labeled.

FIG. 6 shows the node 92*a* in the multi-edge network as being manually labeled with a label "IT" and having an updated confidence value (100%) associated with the manually labeled label. The manually labeled node is assumed as a true, correct label for the node. The retained model confidences are based on the manual labeling. The manually labeled node 92*a* with updated model weights in the multi-edge network 90 is retrained to provide new model confidences (increased width).

FIG. 7 shows the manually labeled node 92*a* that was retrained and shows the propagation of model weights according to link strengths to other nodes, e.g., nodes 92*a*-1 and 92*f*-1 that are shown with greater model weights than their initial model weights (FIG. 5).

Further, according to the optimization process, the selected documents are reviewed by the experts and updated in the dataset, and a machine learning model is built or updated with respect to the reviewed documents. The constraints are evaluated with respect to the reviewed documents, and the process is repeated until the required accuracy requirements are met or some of the limited resources (e.g., expert availability) are exhausted.

The processes described herein can be used in various use cases. As an illustrative example, the processes described herein can be performed by facilitate mapping of millions of financial transactions to a pre-defined cost taxonomy with human validation. As another example, the processes described herein can be used to facilitate AI-aided claims validation with sorting and prioritization of claims with human validation of the most important and/or critical claims. As another example, the processes described herein can be used to facilitate policy segmentation and classification via text mining and intelligent linking of logical blocks. As another example, the processes described herein can be used to facilitate patient recruitment for clinical trials with doctors-in-the-loop extracting clinical features from patients' records, such as symptoms, diagnoses, treatments, lifestyle data matching them against complex trial eligibility criteria.

Data representation as a multi-edge graph allows for assembling the local ensemble models from the weak models and propagating their predictions across the neighboring nodes. Selection of the subset of documents to optimize the manual review can achieve an optimal coverage of the target metrics faster. A graphical machine learning model is tailor-made for the multi-edge network that is a linked document representation that allows for faster inference and more accurate classification of the documents.

Additional Example Processes

FIG. 8A shows an example process 800 for example process for classifying documents using one or more computerized models. In some implementations, the process 800 can be performed by the system 10, distributed computing environment 150, and/or the computing device 180 described in this disclosure (e.g., with reference to FIG. 1, 9A, or 9B).

In the process 800, a computer system generates a structural representation of a plurality of documents (802). The structural representation includes a plurality of nodes and a plurality of edges. The plurality of nodes represent the plurality of documents, and the plurality of edges represent a feature in common between nodes of the plurality of nodes. Each node holds a vector of confidence values for weak models on a current optimization step and a weighted prediction for each of the weak models.

The computer system generates a local ensemble model from the structural representation of the plurality of documents combined with the weighted prediction of the weak models (804). The generated local ensemble model has a higher predictive power than any weak model individually The computer system generates a label for each node based on the local ensemble model (806).

In some implementations, each edge can have a type. Further, each type of an edge can represent a feature of the plurality of documents.

In some implementations, the features of the plurality of documents can be a meta-feature or an associated target metric, or processed unstructured data.

In some implementations, generating a label for each node can provide either a manually confirmed and/or corrected label that is assumed to be a true label or a resulting weighted prediction of the weak models.

In some implementations, confidence values can vary from 0 to 1. Further, the confidence values can represent uncertainty in predictions made by the weak models.

In some implementations, the confidence values can be probability estimates or normalized relative distances to known exemplars of a class of the weak models.

In some implementations, each node can hold a set of weights for each of the weak models.

In some implementations, a sum of the weights can be equal to a value of 1.

Figure 8B:
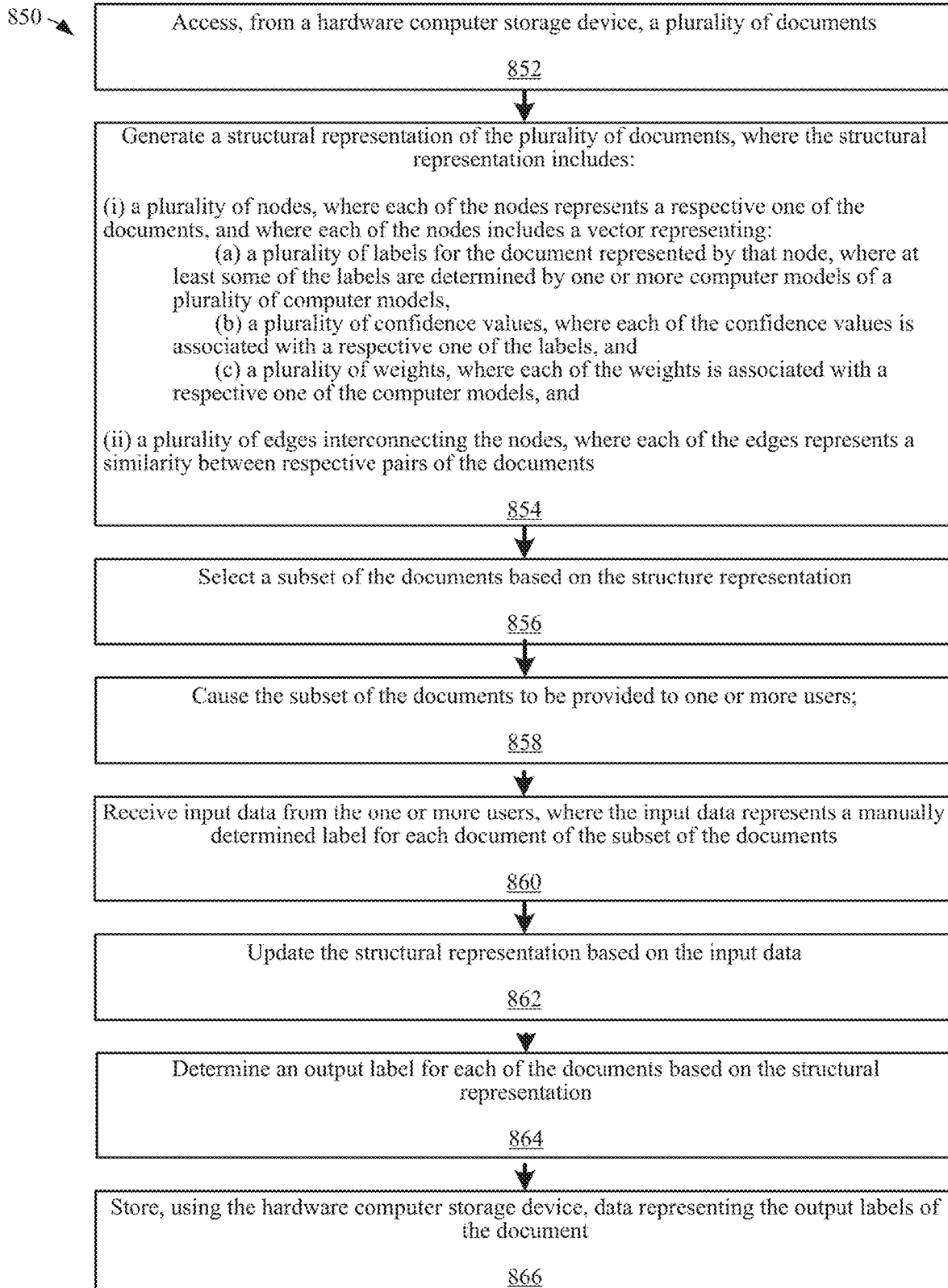

FIG. 8B shows another example process 850 for example process for classifying documents using one or more computerized models. In some implementations, the process 850 can be performed by the system 10, distributed computing environment 150, and/or the computing device 180 described in this disclosure (e.g., with reference to FIG. 1, 9A, or 9B).

In the process 850, a computer system accesses, from a hardware computer storage device, a plurality of documents (852).

The computer system generates a structural representation of the plurality of documents (854).

The structural representation includes a plurality of nodes. Each of the nodes represents a respective one of the documents. Further, each of the nodes includes a vector having (i) a plurality of labels for the document represented by that node, where at least some of the labels are determined by one or more computer models of a plurality of computer models, (ii) a plurality of confidence values, where each of the confidence values is associated with a respective one of the labels, and (iii) a plurality of weights, where each of the weights is associated with a respective one of the computer models.

The structural representation also includes a plurality of edges interconnecting the nodes. Each of the edges represents a similarity between respective pairs of the documents.

In some implementations, each of the edges can have an edge type representing (i) a meta-feature of one or more of the documents, (ii) a target metric associated with one or more of the documents, and/or (iii) processed unstructured data associated with one or more of the documents.

In some implementations, each of the computer models can be a weak model (WM).

In some implementations, generating the structural representation can include, for each of the nodes, setting each of the weights of the nodes to a common value.

In some implementations, generating the structural representation can include, for each of the nodes, setting each of the weights of the nodes based on a trust metric associated with a respective one of the computer models.

The computer system selects a subset of the documents based on the structure representation (856).

In some implementations, selecting the subset of the documents can include determining a relationship between each node to each of its neighboring nodes based on the structural representation, and selecting the subset of the documents based on the relationship.

In some implementations, selecting the subset of the documents can include estimating a change in confidence metrics of the nodes that would result from obtaining a manually determined label for one or more of the documents, and selecting the subset of the documents that would maximize the change in confidence metrics of the nodes.

The computer system causes the subset of the documents to be provided to one or more users (858).

The computer system receives input data from the one or more users (860). The input data represents a manually determined label for each document of the subset of the documents.

The computer system updates the structural representation based on the input data (862).

In some implementations, updating the structural representation can include modifying one or more of the weights of one or more of the nodes and/or modifying one or more of the confidence values of one or more of the nodes. Further, the one or more weights can be modified by a value determined based on a number of the computer models.

In some implementations, updating the structural representation can include (i) determining, based on the input data, that a first label for a first node determined by a first computer model is different from a first manually determined label for the first node, and (ii) in response, decreasing a weight of the first computer model for one or more second nodes that are interconnected to the first node.

In some implementations, updating the structural representation can include (i) determining, based on the input data, that a first label for a first node determined by a first computer model matches a first manually determined label for the first node, and (ii) in response, increasing a weight of the first computer model for one or more second nodes that are interconnected to the first node.

In some implementations, updating the structural representation can include retraining at least one of the computer models.

The computer system determines an output label for each of the documents based on the structural representation (864).

The computer system stores, using the hardware computer storage device, data representing the output labels of the documents (866).

Example Distributed Computing System Environment

Figure 9A:
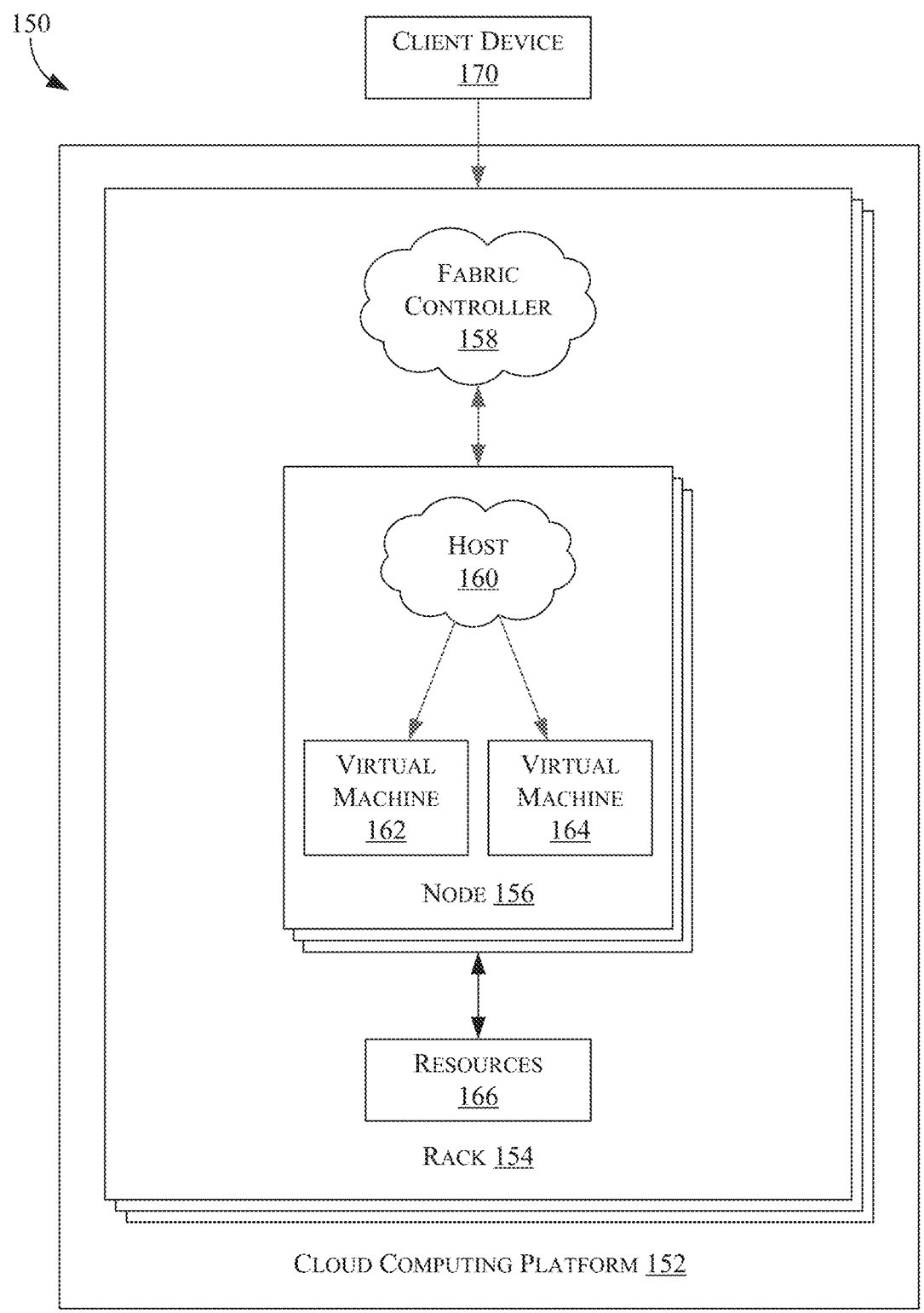
FIG. 9A is a diagram of an example distributed computing environment.

Referring now to FIG. 9A, an example of a distributed computing environment 150 is shown. FIG. 9A shows a high-level architecture of a cloud computing platform 152 that can host a technical solution environment, or a portion thereof (e.g., a data trustee environment). It should be understood that, this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

The distributed computing environment 150 includes data centers that include cloud computing platform 152, rack 154, and node 156 (e.g., computing devices, processing units, or blades) in rack 154. The technical solution environment can be implemented with cloud computing platform 152 that runs cloud services across different data centers and geographic regions. Cloud computing platform 152 can implement fabric controller 158 component for provisioning and managing resource allocation, deployment, upgrade, and management of cloud services. Typically, a cloud computing platform 152 acts to store data or data analytics applications in a distributed manner. Cloud computing platform 152 in a data center can be configured to host and support operation of endpoints of a particular service application. Cloud computing platform 152 may be a public cloud, a private cloud, or a dedicated cloud.

Node 156 can be provisioned with host 160 (e.g., operating system or runtime environment) execution a defined software stack on node 156. Node 156 can also be configured to perform specialized functionality (e.g., compute nodes or storage nodes) within cloud computing platform 152. Node 156 is allocated to run one or more portions of a service application of a tenant. A tenant can refer to a customer utilizing resources of cloud computing platform 152. Service application components of cloud computing platform 152 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 156, nodes 156 may be partitioned into virtual machines (e.g., virtual machine 162 and virtual machine 164). Physical machines can also concurrently run separate service applications. The virtual machines or physical machines can be configured as individualized computing environments that are supported by resources 166 (e.g., hardware resources and software resources) in cloud computing platform 152. It is contemplated that resources can be configured for specific service applications. Further, each service application may be divided into functional portions such that each functional portion is able to run on a separate virtual machine. In cloud computing platform 152, multiple servers may be used to run data analytics applications and perform data storage operations in a cluster. In particular, the servers may perform data operations independently but exposed as a single device referred to as a cluster. Each server in the cluster can be implemented as a node.

Client device 170 may be linked to a service application in cloud computing platform 152. Client device 170 may be any type of computing device, which may correspond to computing device 180 described with reference to FIG. 9B, for example, client device 170 can be configured to issue commands to cloud computing platform 152. In embodiments, client device 170 may communicate with data analytics applications through a virtual Internet Protocol (IP) and load balancer or other means that direct communication requests to designated endpoints in cloud computing platform 152. The components of cloud computing platform 152 may communicate with each other over a network (not shown), which may include, without limitation, one or more local area networks (LANs) and/or wide area networks (WANs).

Example Computing Environment

Figure 9B:
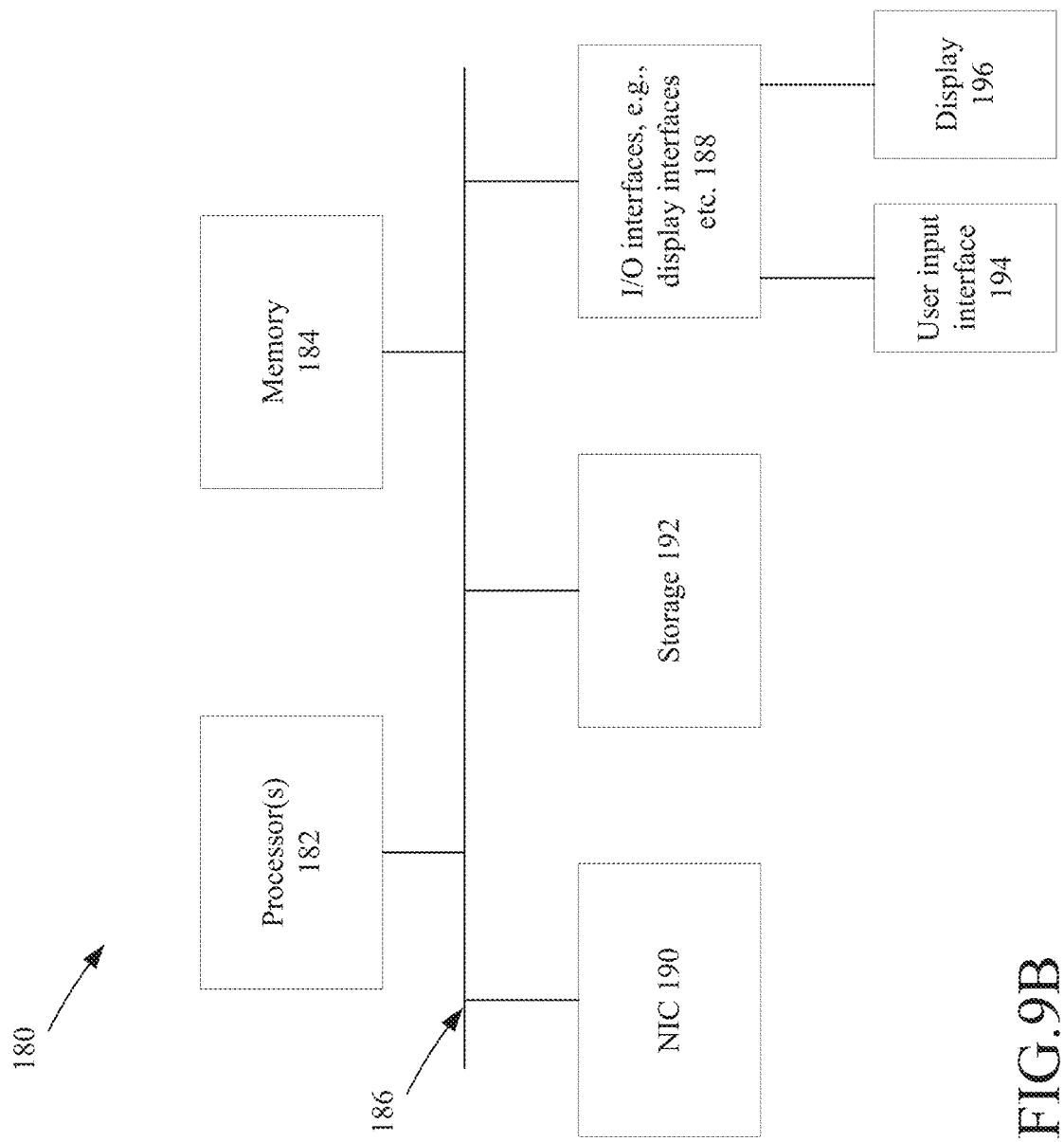
FIG. 9B is a diagram of an example computing device.

Referring to FIG. 9B, an example operating environment for implementing embodiments of the present invention is shown and designated generally as a computer, e.g., a computing device 180. Essential elements of a computing device 180 or a computer or data processing system, etc. are one or more programmable processors 182 for performing actions in accordance with instructions and one or more memory devices 184 for storing instructions and data. Generally, a computing device 180 will also include, or be operatively coupled, (via bus, fabric, network, etc., 186) to input/output (I/O) components 188, e.g., display devices, a network/communication subsystems, such as a network interface card 190, etc. and one or more mass storage devices 192 for storing data (e.g., magnetic, magneto optical disks, or optical disks, or non-volatile semiconductor storage). I/O interfaces 188 are used to connect to user interface devices 194 such as mouse, keypad, keyboard, etc., and a display device 196.

Embodiments can be implemented in digital electronic circuitry, or in computer hardware, firmware, software, or in combinations thereof. Embodiments can be implemented in a computer program product tangibly stored in a machine-readable (e.g., computer readable) non-transitory hardware storage device for execution by a programmable processor; and method actions can be performed by a programmable processor executing a program of executable computer code (executable computer instructions) to perform functions of the invention by operating on input data and generating output. Embodiments can be implemented advantageously in one or more computer programs executable on a programmable system, such as a data processing system that includes at least one programmable processor coupled to receive data and executable computer code from, and to transmit data and executable computer code to, memory, and a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive executable computer code and data from memory, e.g., a read-only memory and/or a random access memory and/or other hardware storage devices. Generally, a computer will include one or more mass storage devices for storing data files; such devices include magnetic disks, such as internal hard disks and removable disks; magneto-optical disks; and optical disks. Hardware storage devices suitable for tangibly storing computer program executable computer code and data include all forms of volatile memory, e.g., semiconductor random access memory (RAM), all forms of non-volatile memory including, by way of example, semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention. Accordingly, other embodiments are within the scope of the following claims.

What is claimed is:

1. A computer implemented method comprising:
   generating by a computer system, a structural representation of a plurality of documents, the structural representation including a plurality of nodes and a plurality of edges, with the plurality of nodes being representations of the plurality of documents and the plurality of edges representing a feature in common between nodes of the plurality of nodes, with each of the nodes comprising a respective vector representing:
      a plurality of labels for the document represented by that node, wherein at least some of the labels are determined by one or more computer models of a plurality of computer models,
      a plurality of confidence values for weak models on a current optimization step and a weighted prediction for each of the weak models, wherein each of the confidence values is associated with a respective one of the labels;
      a plurality of weights, wherein each of the weights is associated with a respective one of the computer models;
   selecting, by the computer system, a subset of the documents based on the structure representation;
   causing, by the computer system, the subset of the documents to be provided to one or more users;
   receiving, by the computer system, input data from the one or more users, wherein the input data represents a manually determined label for each document of the subset of the documents;
   updating, by the computer system, the structural representation based on the input data, wherein updating the structural representation comprises, for a first document of the subset of the documents:
      determining, based on the input data, whether the manually determined label for the first document matches a first label for the first document determined by a first computer model of the plurality of computer models, and
      based on the determination whether the manually determined label for the first document matches the first label, changing a weighting associated with the first computer model for a first node of structural representation corresponding to the first document and one or more additional nodes of the structure representation connected to the first node by one or more of the edges;
   generating by the computer system, a local ensemble model from the structural representation of the plurality of documents combined with the weighted prediction of the weak models, with the generated local ensemble model having a higher predictive power than any weak model individually;
   generating by the computer system, an output label for each node based on the local ensemble model; and
   storing, by the computer system using a hardware computer storage device, data representing the output labels of the documents.

2. The method of claim 1, wherein each edge has a type representing a respective feature of the plurality of documents.

3. The method of claim 2, wherein the features of the plurality of documents comprise at least one of a metafeature, an associated target metric, or processed unstructured data.

4. The method of claim 1, wherein the labels comprise at least one of:
   a manually confirmed label and/or a corrected label that is assumed to be a true label, or
   a resulting weighted prediction of the weak models.

5. The method of claim 1, wherein the confidence values vary from 0 to 1 and the confidence values represent uncertainty in predictions made by the weak models.

6. The method of claim 1, wherein the confidence values are at least one of probability estimates or normalized relative distances to known exemplars of a class of the weak models.

7. The method of claim 6, wherein each node holds a set of weights for each of the weak models.

8. The method of claim 7, wherein a sum of the weights for each node is equal to a value of 1.

9. A computing system comprises:
   one or more processor devices;
   memory operatively coupled to the one or more processor devices; and
   computer storage that stores executable computer instructions to cause the one or more processor devices to:
      generate a structural representation of a plurality of documents, the structural representation including a plurality of nodes and a plurality of edges, with the plurality of nodes being representations of the plurality of documents and the plurality of edges representing a feature in common between nodes of the plurality of nodes, with each of the nodes comprising a respective vector representing:
         a plurality of labels for the document represented by that node, wherein at least some of the labels are determined by one or more computer models of a plurality of computer models,
         a plurality of confidence values for weak models on a current optimization step and a weighted prediction for each of the weak models, wherein each of the confidence values is associated with a respective one of the labels;
         a plurality of weights, wherein each of the weights is associated with a respective one of the computer models;
      select a subset of the documents based on the structure representation;
      cause the subset of the documents to be provided to one or more users;

receive input data from the one or more users, wherein the input data represents a manually determined label for each document of the subset of the documents;

update the structural representation based on the input data, wherein updating the structural representation comprises, for a first document of the subset of the documents:

determine, based on the input data, whether the manually determined label for the first document matches a first label for the first document determined by a first computer model of the plurality of computer models, and based on the determination whether the manually determined label for the first document matches the first label, changing a weighting associated with the first computer model for a first node of structural representation corresponding to the first document and one or more additional nodes of the structure representation connected to the first node by one or more of the edges;

generate a local ensemble model from the structural representation of the plurality of documents combined with the weighted prediction of the weak models, with the generated local ensemble model having a higher predictive power than any weak model individually;

generate an output label for each node based on the local ensemble model; and store, using a hardware computer storage device, data representing the output labels of the documents.

10. The computing system of claim 9 wherein each edge has a type representing a respective feature of the plurality of documents.

11. The computing system of claim 10, wherein the features of the plurality of documents comprise at least one of a meta-feature, an associated target metric, or processed unstructured data.

12. The computing system of claim 9, wherein the labels comprise at least one of:
a manually confirmed label and/or corrected label that is assumed to be a true label, or
a resulting weighted prediction of the weak models.

13. The computing system of claim 9, wherein the confidence values vary from 0 to 1 and the confidence values represent uncertainty in predictions made by the weak models.

14. The computing system of claim 9, wherein the confidence values are at least one of probability estimates or normalized relative distances to known exemplars of a class of the weak models.

15. The computing system of claim 14, wherein each node holds a set of weights for each of the weak models.

16. The computing system of claim 15, wherein a sum of the weights for each node is equal to a value of 1.

17. A computer program product tangibly stored on a non-transitory computer readable medium, the computer program product comprising instructions to cause one or more processor devices to:

generate a structural representation of a plurality of documents, the structural representation including a plurality of nodes and a plurality of edges, with the plurality of nodes being representations of the plurality of documents and the plurality of edges representing a feature in common between nodes of the plurality of nodes, with each of the nodes comprising a respective vector representing:
a plurality of labels for the document represented by that node, wherein at least some of the labels are determined by one or more computer models of a plurality of computer models,
a plurality of confidence values for weak models on a current optimization step and a weighted prediction for each of the weak models, wherein each of the confidence values is associated with a respective one of the labels;
a plurality of weights, wherein each of the weights is associated with a respective one of the computer models;

select a subset of the documents based on the structure representation;

cause the subset of the documents to be provided to one or more users;

receive input data from the one or more users, wherein the input data represents a manually determined label for each document of the subset of the documents;

update the structural representation based on the input data, wherein updating the structural representation comprises, for a first document of the subset of the documents:

determining, based on the input data, whether the manually determined label for the first document matches a first label for the first document determined by a first computer model of the plurality of computer models, and based on the determination whether the manually determined label for the first document matches the first label, changing a weighting associated with the first computer model for a first node of structural representation corresponding to the first document and one or more additional nodes of the structure representation connected to the first node by one or more of the edges;

generate a local ensemble model from the structural representation of the plurality of documents combined with the weighted prediction of the weak models, with the generated local ensemble model having a higher predictive power than any weak model individually;

generate an output label for each node based on the local ensemble model; and store, using a hardware computer storage device, data representing the output labels of the documents.

18. The computer program product of claim 17, wherein each edge has a type representing a respective feature of the plurality of documents.

19. The computer program product of claim 18, wherein the features of the plurality of documents comprise at least one of a meta-feature, an associated target metric, or processed unstructured data.

20. The computer program product of claim 17, wherein the labels comprise at least one of:
a manually confirmed label and/or corrected label that is assumed to be a true label, or
a resulting weighted prediction of the weak models.

* * * * *